(No Model.)

2 Sheets—Sheet 1.

J. R. HOOD.
HANDLE ATTACHING DEVICE FOR TOOLS.

No. 295,922.  Patented Apr. 1, 1884.

WITNESSES
Jas. E. Hutchinson.
S. G. Nottingham.

INVENTOR
Jos. R. Hood,
Attorney.

(No Model.) 2 Sheets—Sheet 2.

J. R. HOOD.
HANDLE ATTACHING DEVICE FOR TOOLS.

No. 295,922. Patented Apr. 1, 1884.

WITNESSES
Jas. E. Hutchinson.
S. G. Nottingham.

INVENTOR
Jos. R. Hood,
By H. A. Symons
Attorney

UNITED STATES PATENT OFFICE.

JOSEPH R. HOOD, OF PHILADELPHIA, PENNSYLVANIA.

HANDLE-ATTACHING DEVICE FOR TOOLS.

SPECIFICATION forming part of Letters Patent No. 295,922, dated April 1, 1884.

Application filed April 2, 1883. (No model.)

*To all whom it may concern:*

Be it known that I, JOSEPH R. HOOD, of Philadelphia, in the county of Philadelphia and State of Pennsylvania, have invented certain new and useful Improvements in Handle-Attaching Devices; and I do hereby declare the following to be a full, clear, and exact description of the invention, such as will enable others skilled in the art to which it appertains to make and use the same.

This invention relates to devices for attaching handles to hoes, rakes, scythes, pitchforks, pruning-knives, and other implements, its object being to provide strong and simple attaching devices which will secure one or more implements firmly and snugly to a handle, and permit of the ready detachment, reversal, or adjustment, and replacement of said implement or implements, as desired.

The invention consists in certain novel constructions and combinations of devices, which will be readily understood by reference to the accompanying drawings, in connection with the following particular description, and will be definitely pointed out in the appended claim.

Figure 1:
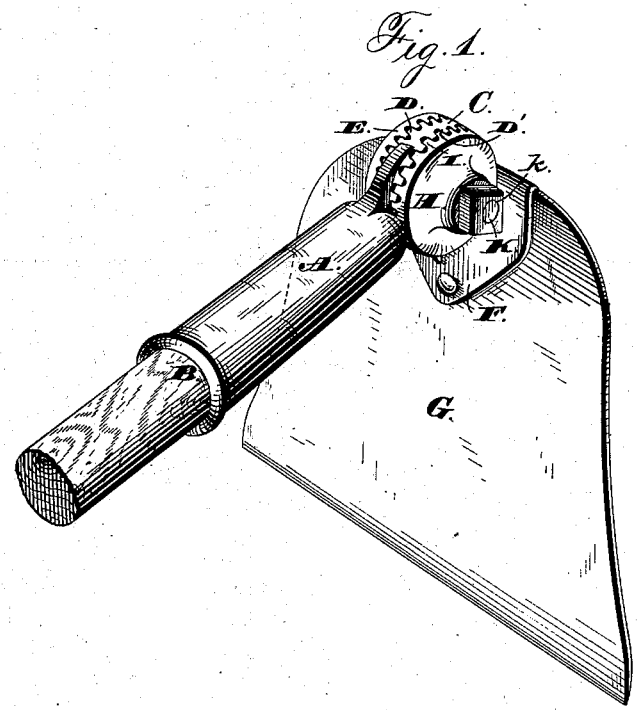
Figure 2:
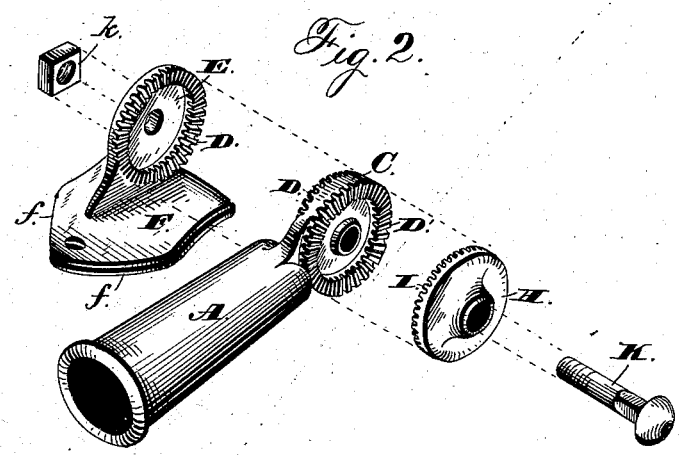
Figure 3:
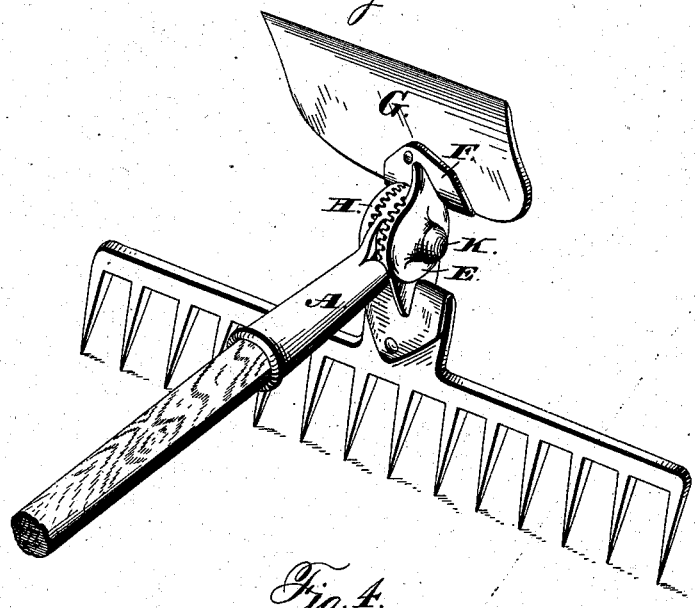
Figure 4:
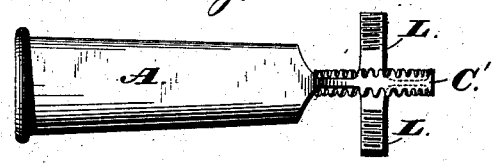
Figure 5:
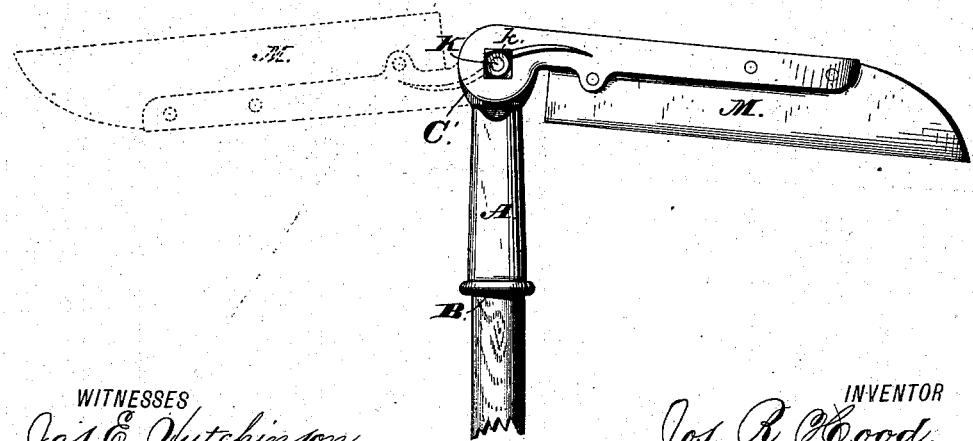

In the drawings, Figure 1 is a perspective view of a hoe connected to its handle by attaching devices constructed according to my invention. Fig. 2 is a perspective view of the attaching devices detached and separated from each other. Fig. 3 is a perspective view of a hoe and a rake attached to the same handle by my improved devices. Fig. 4 is a view in elevation of a modified construction of the shank-disk; and Fig. 5 is a view of a pruning-knife attached to its handle by devices of the modified form.

Referring to Fig. 1, the letter A designates a hollow shank or socket formed to fit on the end of a handle, as shown at B, and having at its end an edgewise attached disk, C, which is provided on both sides with marginal series of crown-teeth or laterally-projecting cogs, as shown at D and D', the teeth of one series projecting from points opposite the spaces between the teeth of the other series.

E is a disk having on one side a marginal series of teeth adapted to engage or mesh with the teeth on either side of disk C, and said disk E has attached to its edge a clip, F, to receive the back of a hoe-blade, as shown at G.

H is a cap-disk having a single series of teeth, I, adapted to engage with the teeth on either side of disk C. Each of the disks has a central opening to receive a bolt, K, which, with its nut $k$, holds them together when the clip-disk E is engaged with one side and the cap-disk H with the other side of the shank-disk C, as shown.

It is obvious that by loosening the nut and disengaging the teeth of the clip-disk E from the teeth D of the shank-disk the said clip-disk may be turned on the bolt to adjust the hoe to any desired inclination, and may be then re-engaged and secured; and it will be further seen that owing to the arrangement of the two series of the teeth of the shank-disk in dodging order—that is, the teeth of one series being opposite the spaces of the other—the hoe may be given much finer or smaller and twice the number of different adjustments which would be possible if the shank-disk had teeth only on one side. For instance, if it were desired to adjust the hoe-edge a distance less than that resulting from turning of its clip-disk the space of one tooth of series D, the disks would be separated and the teeth D' on the opposite side of the shank-disk turned to engage with the clip-disk, and as these teeth D' stand opposite the spaces of the series D, an adjustment of half the space of a tooth may be given to the clip-disk.

The office of the cap-disk in Fig. 1 is simply to protect the series of shank-disk teeth which is not in use and prevent said series from becoming clogged with earth or other matter.

In Fig. 3 I have shown two clip-disks engaging with the shank-disk, one carrying a hoe and the other a rake, and both of which may be adjusted or reversed.

In the modification shown in Fig. 4 the shank-disk C', instead of having a central bolt-hole, is provided with centrally-projecting attached bolts or screw-pins L L, each of which may receive a clip-disk carrying an implement, as shown in Fig. 3, or one may receive an implement and the other a cap-disk, as in Fig. 5. In this figure a pruning-knife, M, is shown attached to its handle in full lines for a pulling cut and in dotted lines for a thrust cut, this reversal of position being, as is well known, frequently desirable, and obviously attainable by simply adjusting its clip-disk a half-circle. A greater or less adjustment could of course be given to the knife, if desired. The teeth of all the disks are preferably somewhat wedge-shaped, as shown, and slightly wider at their bases and tips than are the corresponding portions of the spaces, so that they do not quite reach the inner ends of the spaces, but are so wedged into said spaces that they are not liable to become loose, and any wear may be taken up by tightening the nuts up on the bolts.

The clip F may be attached to its disk either transversely, as shown in Figs. 1, 2, and 3, or it may stand edgewise if the nature of the implement it is intended to receive requires it to have such a position. This clip consists of two nearly-parallel plates, $ff$, connected at their inner edges, and provided with corresponding rivet-holes. When a blade or hoe-plate is clamped between the two plates of such a clip, the strain is taken off the portions of the plate or blade immediately around or close to the rivets and distributed over a considerable space, so that a firm attachment not liable to rupture is secured.

I wish it to be understood that I do not confine myself to placing the disk having two series of teeth on the handle-shank, as a clip-disk may obviously be provided with two series of teeth and the shank-disk with one series without departing from the principle of my invention.

By the employment of the disk C with a series of teeth on its opposite sides, and disks E attached to a hoe or similar implement, two implements may be attached to the same handle, each being adjustable independently of the other, and when one is not in use the teeth on that side of disk C are covered and protected by the toothed disk H.

Having fully described my invention, what I claim as new, and desire to secure by Letters Patent, is—

The combination, with the handle-socket A, provided with the disk C, having a series of teeth on its opposite sides, of toothed disks E, attached to a hoe or other implement, whereby two implements may be adjustably secured to the single disk C, and a toothed disk, H, for protecting the series of teeth on one side of the disk C when only one implement is secured thereto, substantially as set forth.

In testimony whereof I have signed this specification in the presence of two subscribing witnesses.

JOSEPH R. HOOD.

Witnesses:
  WM. HOLLOWELL,
  MATHIAS SEDDINGER.